United States Patent
Donner

(10) Patent No.: US 12,128,987 B2
(45) Date of Patent: Oct. 29, 2024

(54) DRIVE TRAIN COMPRISING TWO SEPARATE SHIFTABLE GEAR MECHANISMS WHICH ARE COUPLED BY MEANS OF INTERMEDIATE GEAR MECHANISMS

(71) Applicant: Wilfried Donner, Bad Neuenahr-Ahrweiler (DE)

(72) Inventor: Wilfried Donner, Bad Neuenahr-Ahrweiler (DE)

( * ) Notice: Subject to any disclaimer, the term of this patent is extended or adjusted under 35 U.S.C. 154(b) by 659 days.

(21) Appl. No.: 16/761,403

(22) PCT Filed: Oct. 30, 2018

(86) PCT No.: PCT/DE2018/000314
§ 371 (c)(1),
(2) Date: Nov. 10, 2021

(87) PCT Pub. No.: WO2019/086064
PCT Pub. Date: May 9, 2019

(65) Prior Publication Data
US 2022/0111928 A1    Apr. 14, 2022

(30) Foreign Application Priority Data

Nov. 2, 2017 (DE) ...................... 10 2017 012 265.2
Oct. 29, 2018 (DE) ...................... 10 2018 008 464.8

(51) Int. Cl.
*B62M 11/18* (2006.01)
*B62M 1/36* (2013.01)
(Continued)

(52) U.S. Cl.
CPC .............. *B62M 11/18* (2013.01); *B62M 1/36* (2013.01); *B62M 3/003* (2013.01); *B62M 6/55* (2013.01);
(Continued)

(58) Field of Classification Search
CPC ..... B62M 11/16; B62M 11/18; B62M 11/145; B62M 25/04; B62M 25/045; B62M 1/36;
(Continued)

(56) References Cited

U.S. PATENT DOCUMENTS 5,083,991 A    1/1992  Yang
10,407,129 B2 *  9/2019  Yamamoto ........... B62M 11/145
(Continued)

FOREIGN PATENT DOCUMENTS

CN    2823106 Y * 10/2006 ............ B62M 11/14
CN    206171708 U    5/2017
(Continued)

OTHER PUBLICATIONS

Tobias, "HNF Heisenberg XF1—BMW technology for Kalle Nicolai's next E-MTB [PM]", www.mtb-news.de/news/2015/07/27/hnf-heisenberg-xf1-e-mtb-pedelec-bmw-i-nicolai/, Jan. 11, 2021.

*Primary Examiner* — Lori Wu
(74) *Attorney, Agent, or Firm* — Browdy and Neimark, PLLC

(57) ABSTRACT

A drive train for muscle-driven single-track or multi-track vehicles with a crank-driven bottom bracket gearbox which is connected on the output side to a chain or belt drive from which a chain or belt leads directly or shiftably to a pinion to a rear wheel hub, belt leads directly or switchably in each case to a pinion to a rear wheel hub, wherein in addition to the bottom bracket gearbox, which is designed as a primary gearbox with n speeds or with variable transmission ratio, a rear-mounted gearbox is also arranged in the drive train as a switchable rear wheel hub gearbox with m=two or m=three speeds, wherein n and m are natural numbers. In addition to the bottom bracket gearbox, which is designed as a primary gearbox with n speeds, the drive train also includes a
(Continued)

rear-mounted gearbox as a shiftable rear wheel hub gearbox with m=two or m=three speeds.

20 Claims, 18 Drawing Sheets

(51) Int. Cl.
  *B62M 3/00* (2006.01)
  *B62M 6/55* (2010.01)
  *B62M 9/06* (2006.01)
  *B62M 11/14* (2006.01)
  *B62M 25/04* (2006.01)

(52) U.S. Cl.
  CPC ............ *B62M 9/06* (2013.01); *B62M 11/145* (2013.01); *B62M 25/04* (2013.01)

(58) Field of Classification Search
  CPC .......... B62M 3/003; B62M 6/55; B62M 9/06; B62M 9/04; B62K 19/34; B62K 25/30
  See application file for complete search history.

(56) References Cited

U.S. PATENT DOCUMENTS

| | | | |
|---|---|---|---|
| 11,541,964 | B2 | 1/2023 | Donner |
| 2015/0101874 | A1 | 4/2015 | Getta et al. |
| 2015/0148173 | A1* | 5/2015 | Kim ..................... B62M 6/65 |
| | | | 475/149 |

FOREIGN PATENT DOCUMENTS

| | | |
|---|---|---|
| DE | 102004045364 B4 | 8/2006 |
| DE | 102007004802 B4 | 7/2008 |
| DE | 102007013443 A1 | 9/2008 |
| DE | 202014103469 U1 | 10/2015 |
| DE | 102018007326 A1 | 10/2019 |
| EP | 0915800 A1 | 8/2003 |
| WO | 9512517 A1 | 5/1995 |
| WO | 0043259 A1 | 7/2000 |
| WO | 2004/079223 A2 | 9/2004 |
| WO | 2011004988 A2 | 1/2011 |
| WO | 2011013109 A1 | 2/2011 |
| WO | 2012/156613 A1 | 11/2012 |

* cited by examiner

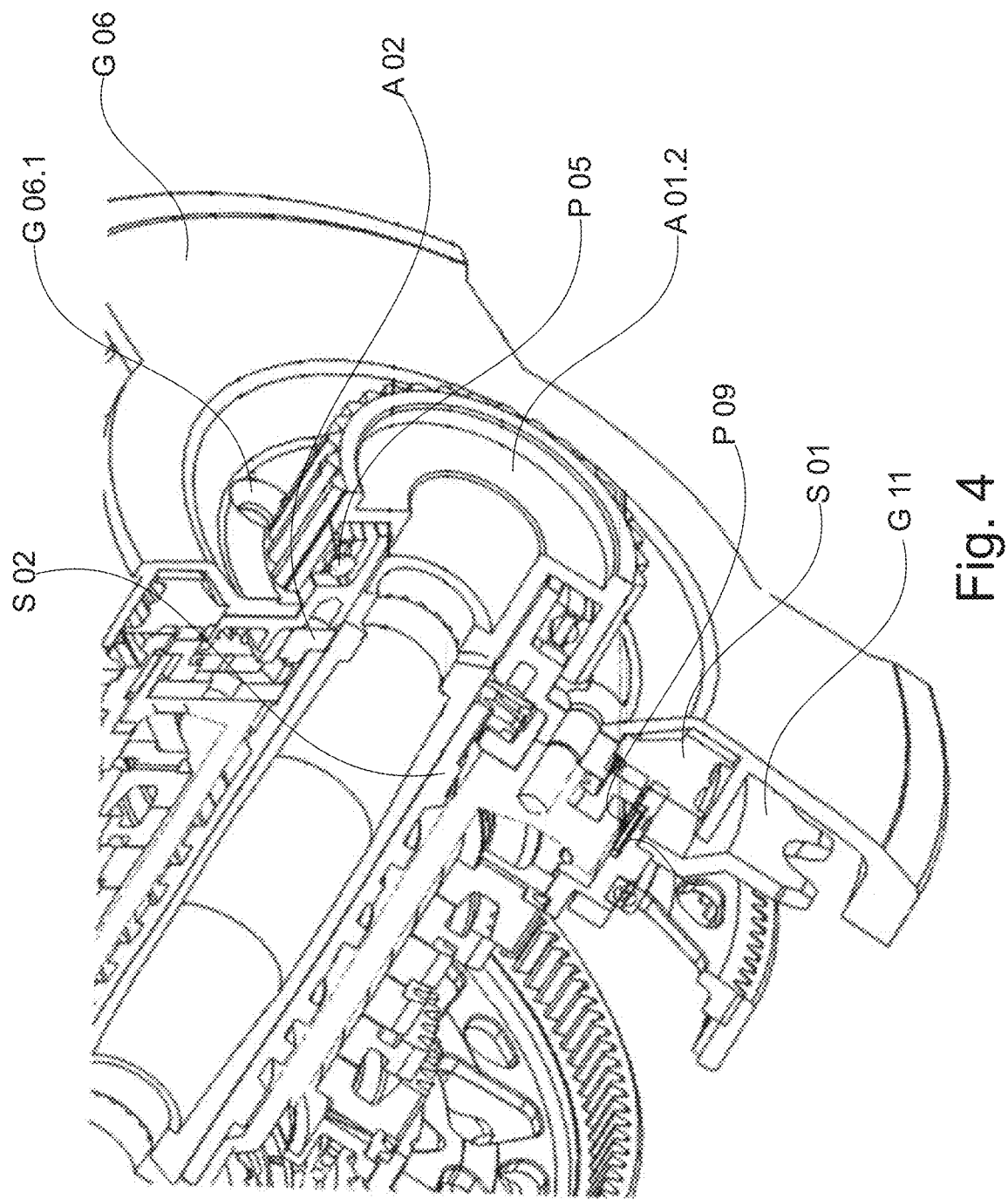

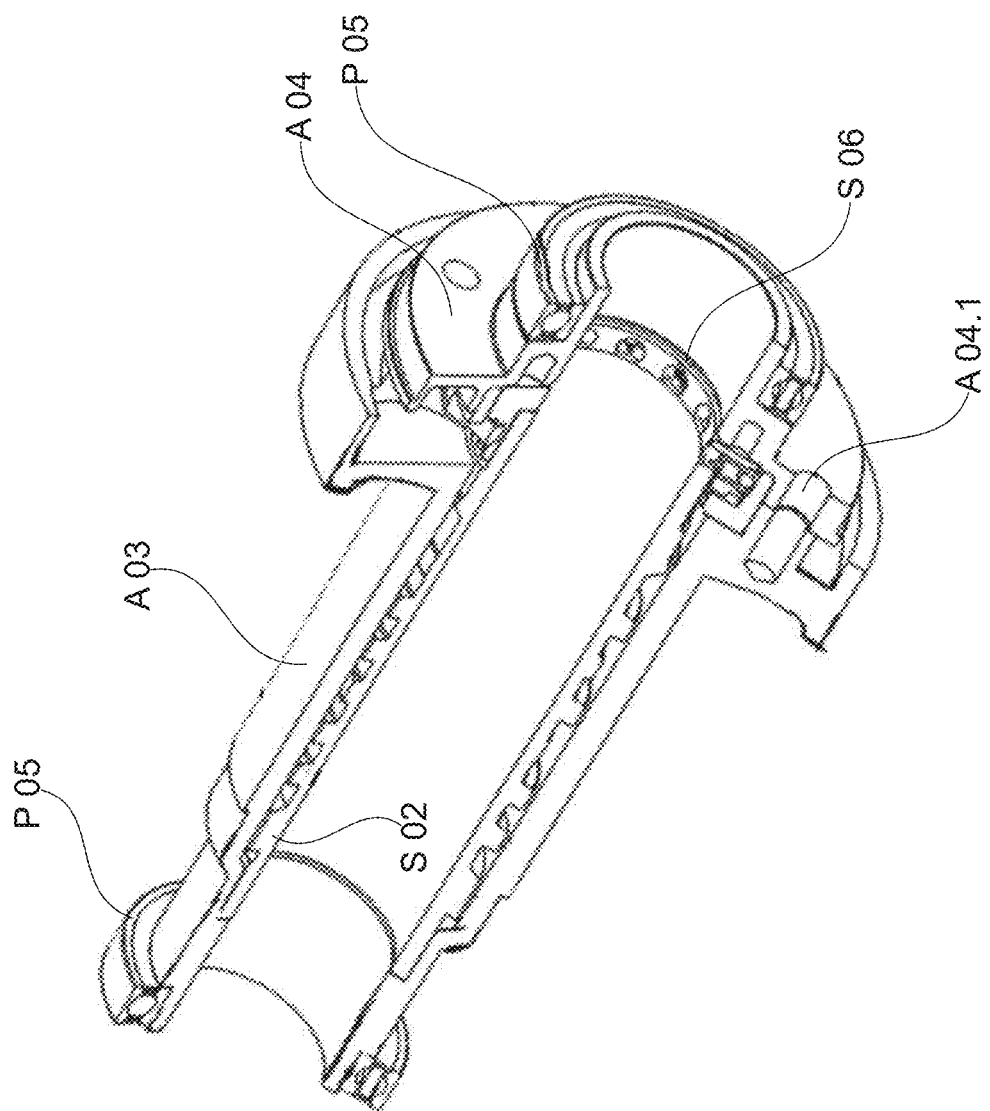

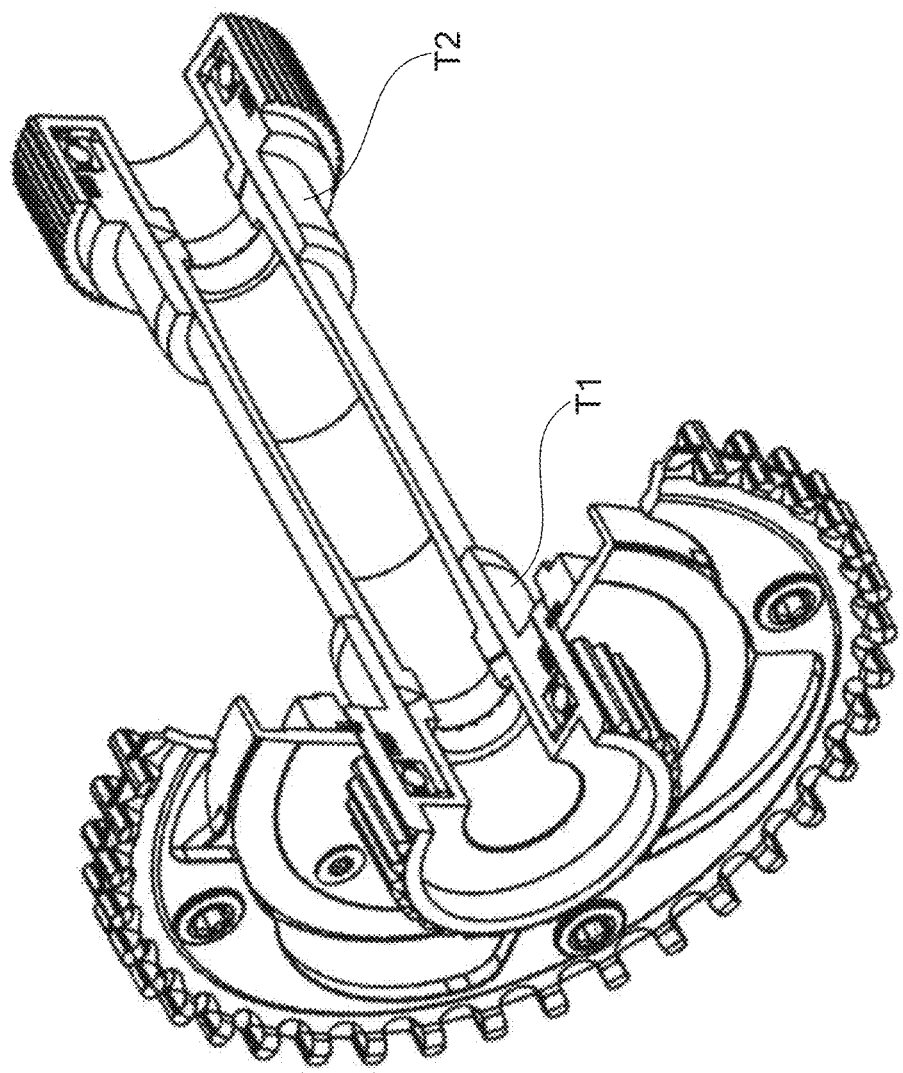

DRIVE TRAIN COMPRISING TWO SEPARATE SHIFTABLE GEAR MECHANISMS WHICH ARE COUPLED BY MEANS OF INTERMEDIATE GEAR MECHANISMS

FIELD

In accordance with the generic term of the main claim, the invention relates to a drive train for single- or dual-track vehicles with a crank-driven bottom bracket gearbox which is connected on the output side to a chain or belt drive, from which a chain or belt leads directly or switchably in each case to a pinion on a rear wheel hub which also contains a switchable gearbox. Advantageous embodiments are given in the dependent and accessory claims.

BACKGROUND

Shiftable gearboxes are known from the prior art. The characteristic of all these gearboxes is that either all speeds are accommodated in the rear wheel hub or all speeds are accommodated in a bottom bracket gearbox.

The disadvantage of rear wheel hub gearboxes (e.g. EP 0 915 800 B1) is that their mass in practically all known bicycle models reaches or exceeds about two kg and that only 130 Nm peak input torque can be transmitted, making them unsuitable for full-suspension bicycles. Modern derailleur gears with 11 or 12-fold cassettes with 10 to 51 teeth, together with a rear wheel hub, longer chain and rear derailleur, have about 1 kg of unsprung mass.

The disadvantage of known bottom bracket gearboxes is that very high peak torques have to be absorbed largely without damping. The gearbox known from DE 10 2007 004 802 A1 has up to 18 speeds and is said to be able to be loaded with a peak torque of 250 Nm. This torque can already be applied by drivers in a sporty driving style. This means that the transmission has no reserves for shock peaks when pedaling, tandem drive or coupling an additional motor drive or both.

A further disadvantage of both aforementioned gear types is that with the plurality of speeds with only one pawl per gear wheel, it is necessary to engage the toothing inside the gear wheels located on an axle, whereby a point load occurs in each case with the further disadvantage that these pawls can also be shifted unfavorably under load, due to their small contact surfaces.

SUMMARY

It is the object of the invention to provide a drive train which does not have the disadvantages described above. The solution is provided by a split transmission according to the independent claim. Advantageous embodiments are given in the dependent and accessory claims. The following embodiments are preferred embodiments.

BRIEF DESCRIPTION OF THE DRAWINGS

FIGS. 3 and 4 show the drive train according to the invention;

FIG. 5 show an embodiment of a gear axle of the drive train;

FIG. 5A show an embodiment of a gear axle of the drive train;

DETAILED DESCRIPTION

Figure 1:
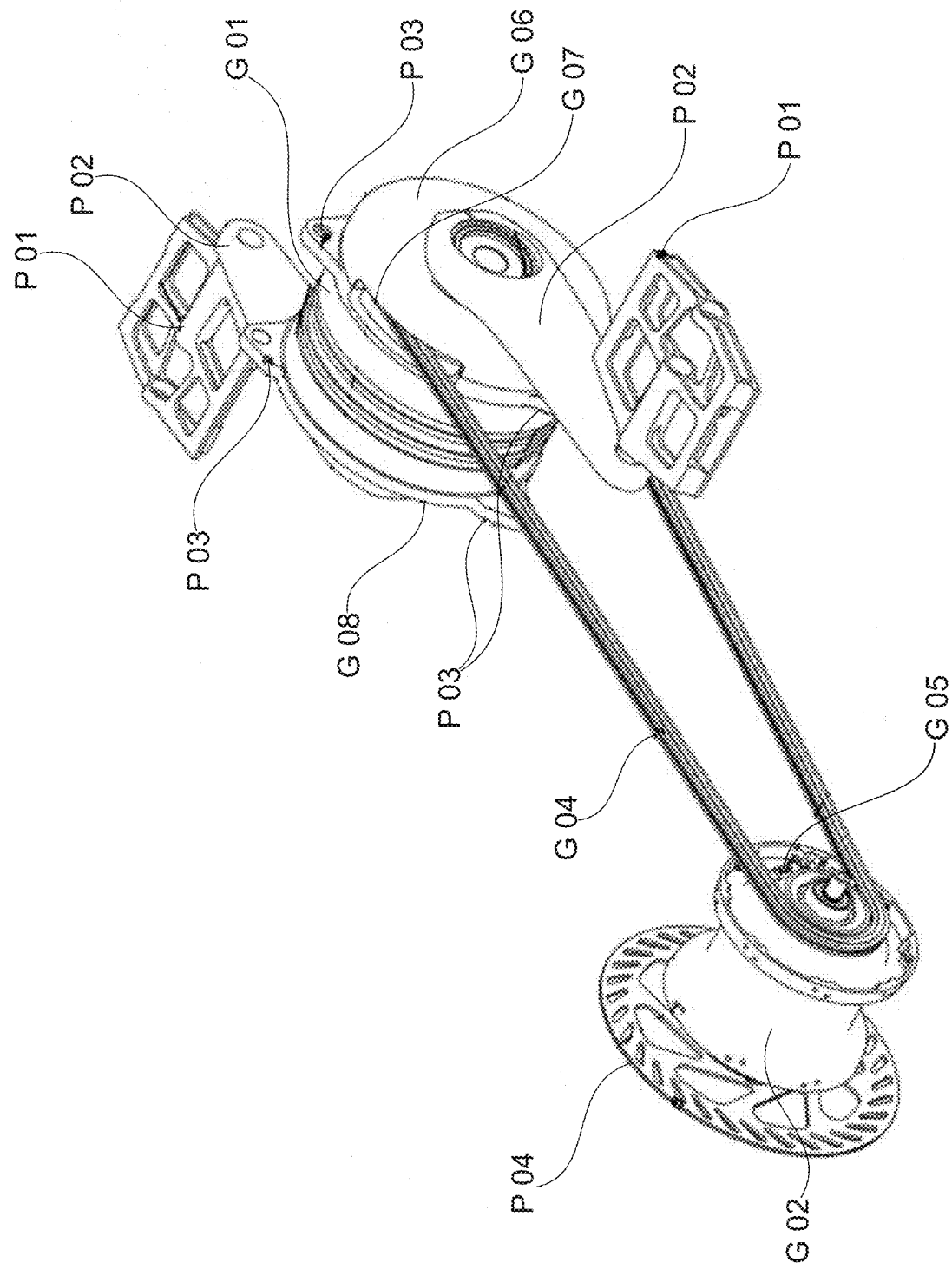
FIG. 1 shows an example of a drive train according to the invention.

The gearbox consists of two separate dividing gears. The first dividing gear is a bottom bracket gearbox through which the bottom bracket shaft passes. Here, n equally stepped basic speeds are shifted. The other speeds are obtained via a rear-mounted gearbox with two or three speeds, which is located in the rear wheel hub. The dividing gears therefore require little axial space and offer sufficient space for coupling further drives into the bottom bracket gearbox driver, i.e. into the bottom bracket shaft, e.g. an additional e-motor and/or a tandem drive. This ensures that a total of 2n or 3n speeds can be shifted in succession without changing the speed step and that the bottom bracket gearbox can be provided with a peak input torque of e.g. 400 Nm, which is sufficient for all conventional applications.

Preferably, both dividing gears are coupled in such a way that they can be shifted from only one rotary handle. Power transmission is preferably by means of shift cables, with the second dividing gear either being controlled by the first dividing gear by means of looping, or the second dividing gear being controlled in the same way as the first dividing gear from the rotary handle but with its own cables.

Alternatively, switching pulses are transmitted electrically from a manual switch, e.g. to stepper motors, which cause the respective switching device of the individual dividing gears to move linearly or rotationally.

In a first, preferred embodiment, the drive train comprises a bottom bracket gearbox (G01) with n speeds, a rear-mounted gearbox (G02) with one direct speed and one ratio step into slow, i.e. two speeds, and a secondary gearbox (G04), which can be designed as a chain or belt drive. The bottom bracket gearbox is preferably a gearbox with input and output coaxial to the bottom bracket shaft, whereby it is irrelevant whether it is an epicyclic gearbox or one with countershaft(s). Furthermore, the output shaft has a certain distance from the bottom bracket shaft, as shown for example in WO 2012/156613 A1, DE 100 82 555 B4, DE 10 2007 013 443 A1 and DE 10 2004 045 364 B4. Either a gear wheel, a chain wheel or a friction gearbox as known from DE 60 2004 029 557.4 or EP 04 71 5691.4 is provided. If the bottom bracket gearbox (G01) has n speeds with almost equal speed steps of $s=1+p \%/100$, then it has a gear ratio range of $s^{(n-1)}$, and thus the rear-mounted gearbox (G02) has a transmission ratio of $i=s^n$. The total gear ratio range ii is then $u=s^{(2n-1)}$.

The start of this gear ratio range is also determined by the transmission ratio of the secondary gearbox. A variant of the embodiment uses a different rear-mounted gearbox (G02) in the rear wheel hub, namely with three speeds. The first speed transmits to slow with i_1=s^n, the second speed is the direct speed with i_2=1 and the third speed transmits to fast with i_3=s^(-n). This rear-mounted gearbox has only a slightly larger mass than one with two speeds and triples the number of shiftable speeds of the bottom bracket gearbox (G01) without gear overlap while maintaining the speeds of the same. With the above configuration, very high gear ratio ranges ü=s^(3n-1) can be achieved. For example, a bottom bracket gearbox (G01) with s=1.1 has twenty-one speeds with a gear ratio range of ü=1.1^(21-1)=6.7275, i.e. approx. 673%. In the bottom bracket gearbox, noticeably fewer gear ratios are required, and with the gear wheels saved, costs and mass are also reduced. The split gearbox described above (G01 with G02) can be implemented with three ring gears, three dual planets three times each and with five sun gears. A preferred configuration of the secondary gearbox (G04) comprises selecting the transmission ratio such that the rear-mounted gearbox is operated predominantly in direct speed for normal operating requirements, such as cycling on level terrain and/or in the absence of luggage loads.

If the rear-mounted gearbox in the rear wheel hub has three speeds with e.g. i_1=1.9, i_2=1 and i_3=1/1.9, the speed steps s of the bottom bracket gearbox with e.g. n=3, n=4, n=5 and n=6 speeds are configured like this, using the same rear wheel hub each time. For the speed steps s(n) we get s(n)={n}sqrt(i_1=1.9). This gives approximate values for s(3)=1.239, for s(4)=1.174, for s(5)=1.137 and for s(6)=1.113. Exemplary embodiments are shown in the following tables.

TABLE 1

Rear-mounted gearbox G02 with 3 speeds [s = 1.9 < 2]

| | teeth numbers | | | |
|---|---|---|---|---|
| | dividing gear 1 | dividing gear 2 | | comment |
| ring gear | −113 | | −113 | dividing gear 1: |
| web/planets | 35 | 20 | 20 | 35 | input: ring gear 1; |
| sun gear | — | 58 | 58 | — | output: web 1 dividing gear 2: |
| | | | | | input: web 2; output: ring gear 2 webs coupled |

TABLE 2

G01 bottom bracket gearbox with 3 speeds [s(3) = 1.239]

| | teeth numbers | comment |
|---|---|---|
| ring gear | −93 | All transmission ratios <= 1 input: web; output: ring gear |

TABLE 1

Rear-mounted gearbox G02 with 3 speeds [s = 1.9 < 2]

| | teeth numbers | comment |
|---|---|---|
| web/planets | 34 | 21 |
| sun gear | 36 | 48 |

TABLE 3

Bottom bracket gearbox G01 with 4 speeds [s(4) = 1.174]

| | teeth numbers | | | |
|---|---|---|---|---|
| | dividing gear 1 | dividing gear 2 | | comment |
| ring gear | | −84 | −84 | | All transmission |
| web/planets | 23 | 17 | 17 | 23 | ratios <= 1 ring |
| sun gear | 42 | 51 | — | 42 | gears coupled dividing gear 1: input: web 1; output: ring gear 1 dividing gear 2: input: ring gear 2; output: web 2 |

TABLE 4

G01 bottom bracket gearbox with 5 speeds [s(5) = 1.137]

| | teeth numbers | | | |
|---|---|---|---|---|
| | dividing gear 1 | dividing gear 2 | | comment |
| ring gear | | −90 | −90 | | Of the possible seven |
| web/planets | 32 | 24 | 24 | 32 | speeds, five successive |
| sun gear | 35 | 42 | 42 | 35 | speeds are shifted with, for example, the smallest transmission ratios, otherwise like bottom bracket gearbox G01 with 4 speeds |

TABLE 5

G01 bottom bracket gearbox with 6 speeds [s(6) = 1.113]

| | teeth numbers | | | |
|---|---|---|---|---|
| | dividing gear 1 | dividing gear 2 | | comment |
| ring gear | | −93 | −93 | | All transmission |
| web/planets | 17 | 26 | 21 | 21(24) | 26(28) ratios <= 1 ring |
| sun gear | 54 | 44 | 51 | — | 44(41) gears coupled dividing gear 1: input: web 1; output: ring gear 1 dividing gear 2: input: ring gear 2; output: web 2 |

For example, with 7 speeds of the bottom bracket gearbox with e.g. s(7)=1.145, the result for the rear-mounted gearbox is s=2.58. This configuration is shown in the following tables.

TABLE 6

Rear-mounted gearbox G02 with 3 speeds [s = 2.58]

| | teeth numbers | | | |
|---|---|---|---|---|
| | dividing gear 1 | dividing gear 2 | | comment |
| ring gear | −96 | | | −96 | dividing gear 1: |
| web/planets | 25 | 21 | 21 | 25 | input: web 1; output: |
| sun gear | — | 51 | 51 | — | sun gear 1 dividing gear 2: input: sun gear 2; output: web 2 sun gears coupled |

TABLE 7

G01 bottom bracket gearbox with 7 speeds [s(7) = 1.145]

| | teeth numbers | | | | comment |
|---|---|---|---|---|---|
| | dividing gear 1 | | dividing gear 2 | | |
| ring gear | | −92 | −92 | | ring gears coupled |
| web/planets | 30 | 22 | 22 | 30 | dividing gear 1: input: web 1; output: ring gear 1 dividing gear 2: input: ring gear 2; output: web 2 |
| sun gear | 39 | 46 | 46 | 39 | |

A further preferred embodiment of a bottom bracket gearbox with 7 speeds has a speed step s(7) of approx. 1.1627 where the rear-mounted gearbox has 3 speeds with s=2.8824. The rear-mounted gearbox is built with single planets, further reducing mass and axial length. With switched, consecutive 13 of 21 speeds, a transmission ratio span of approximately 610% is achieved. An exemplary configuration is shown in the following tables.

TABLE 8

Rear-mounted gearbox G02 with 3 speeds [s = 2.8824]

| | teeth numbers | | comment |
|---|---|---|---|
| | dividing gear 1 | dividing gear 2 | |
| ring gear | −96 | −96 | dividing gear 1: input: web 1; output: sun gear 1 dividing gear 2: input: sun gear 2; output: web 2 sun gears coupled |
| web/planets | — | 22 | |
| sun gear | — | 51 | |

TABLE 9

Bottom bracket gearbox G01 with 7 speeds [s(7) = 1.1627]

| | teeth numbers | | | | comment |
|---|---|---|---|---|---|
| | dividing gear 1 | | dividing gear 2 | | |
| ring gear | | −84 | −84 | | ring gears coupled |
| web/planets | 25 | 18 | 18 | 25 | dividing gear 1: input: web 1; output: ring gear 1 dividing gear 2: input: ring gear 2; output: web 2 |
| sun gear | 41 | 48 | 48 | 41 | |

FIG. 01 shows an example of a drive train according to the invention with the pedals (P01) attached to crank arms (P02). The bottom bracket gearbox (G01) is attached to a bicycle frame (not shown) by means of attachment lugs (P03), for example. The sprocket housing also serves as a torque support (G06), with the chain (G04) coming out through openings (G07), only the upper one is visible here. An input side housing cover (G08), completes the housing. The two- or three-speed rear-mounted gearbox (G02) is located in the rear wheel hub. The gearbox is driven by a pinion (G05). A brake disk (PO4) is also shown, which is attached to the hub shell.

In an advantageous embodiment, the drive train according to the invention has three torque inputs. All torque inputs are located on one side, e.g. in the left-hand direction of travel.

These are i.e. the normal single rider with pedal cranks on the bottom bracket shaft; a motor drive, which is preferably arranged axis-parallel to the bottom bracket shaft and is connected to the bottom bracket shaft/driver with a gear wheel, belt/chain coupling, or is arranged orthogonally to the bottom bracket shaft and is connected to the bottom bracket shaft with an angular gear. In each case, the motor drive has an overrunning clutch; everything that serves to feed the drive is fully enclosed in a housing; a tandem drive is connected directly to the bottom bracket shaft in a torque-proof manner. In this case, both drivers are torque-proof coupled via a chain or belt in always the same relative crank position. Of course, fewer torque inputs can also be set up and/or used.

Figure 2:
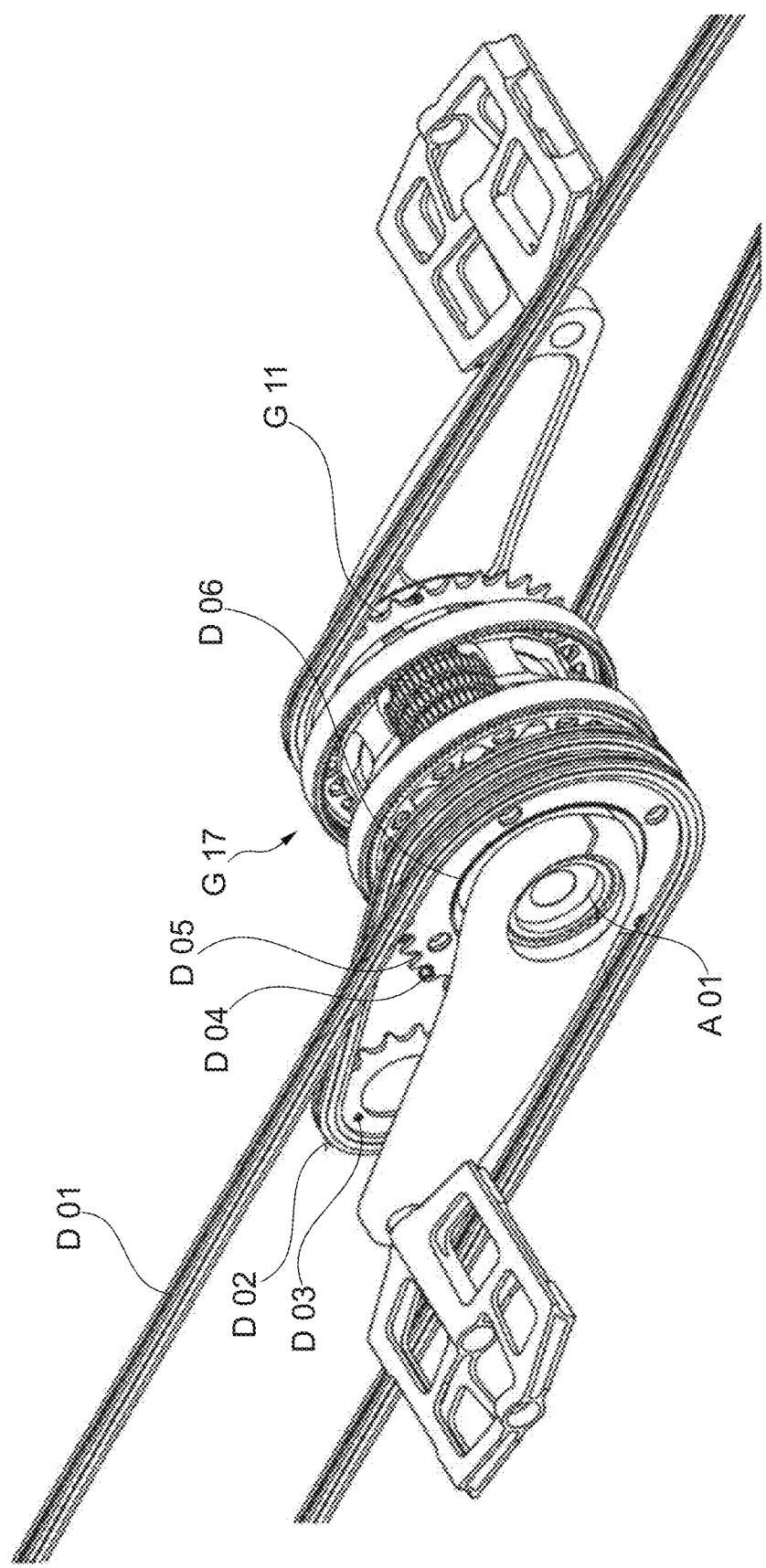
FIG. 2 shows the drive train according to the invention without a housing.

FIG. 02 shows the drive train G17 according to the invention without housing. The chain (D01) shown and the associated chain wheel (D04), which is bolted to the tandem adapter (D06), are part of the tandem drive. The tandem adapter is torque-proof connected to the input side crank adapter (A01) via a toothing. The torque coupling of the motor (not shown), which is arranged axially parallel, is effected by means of the chain (D02) from the motor pinion (D03) to the chain wheel (D05), which is largely concealed here, and from there via the driver (G10) into the gearbox. When the bottom bracket shaft (A02) is at a standstill, the overrunning clutch (D07, D08) decouples the bottom bracket shaft from the driver so that the pedal cranks are not carried along by the motor. If the motor is put out of operation, another freewheel prevents the motor and its reduction gear from being dragged along. Both freewheels are also present when the motor shaft is arranged orthogonally to the bottom bracket shaft.

The new bottom bracket shaft comprises the central part (A 02) and the two crank adapters (A01.1, A 01.2), which are connected to each other, for example, by means of a positive and self-centering spur gearing (A 01.3) by means of an axial screw connection—not shown. The crank adapters have toothing (A 01.4), with the aid of which the pedal cranks are connected to the bottom bracket shaft in a torque-proof manner. The crank adapter (A 01.1) may also carry the tandem adapter (D 06), a circlip (P 06) and a freewheel disk (D 07) with spur gearing which has a locking function in one direction only. The freewheel disk and the tandem adapter are axially screwed together (D 06.1) and axially fixed by the circlip (P 06). The adapter-fixed freewheel disk (D 07) is rotatably connected to the driver (G 10) via the plain bearing (P 08). Torque is transmitted into the driver by means of the freewheel disk (D 08), which is axially displaceable in a toothing (G 10.1) of the driver (G 10) and has a locking function acting in one direction of rotation, into the toothing from the freewheel (D07). The spiralled spring (P 07) ensures that torque is only interrupted when the motor overruns and when pedaling backwards. The chain, belt or crown wheel responsible for the motor drive sits on the drive and is connected to it by means of a decoupling clutch and a roller bearing. If the motor is put out of operation, the motor/driver joint is broken and the roller bearing ensures low friction losses. In another advantageous embodiment, the bottom bracket gearbox (G01) is a planetary gearbox and corresponds, for example, to the known structure of the first two stages of a gearbox according to EP 0 915 800 B1, whereby a structure with triple stage planets provides 11 speeds or one with double stage planets provides 7 speeds. The speed steps are, for example, 9% for triple-step planets and 13.6% for double-step planets. The novel first dividing gearbox has no intermediate gear mechanisms; instead, the bottom bracket shaft coincides with the axis of rotation of the gearbox.

Figure 3:
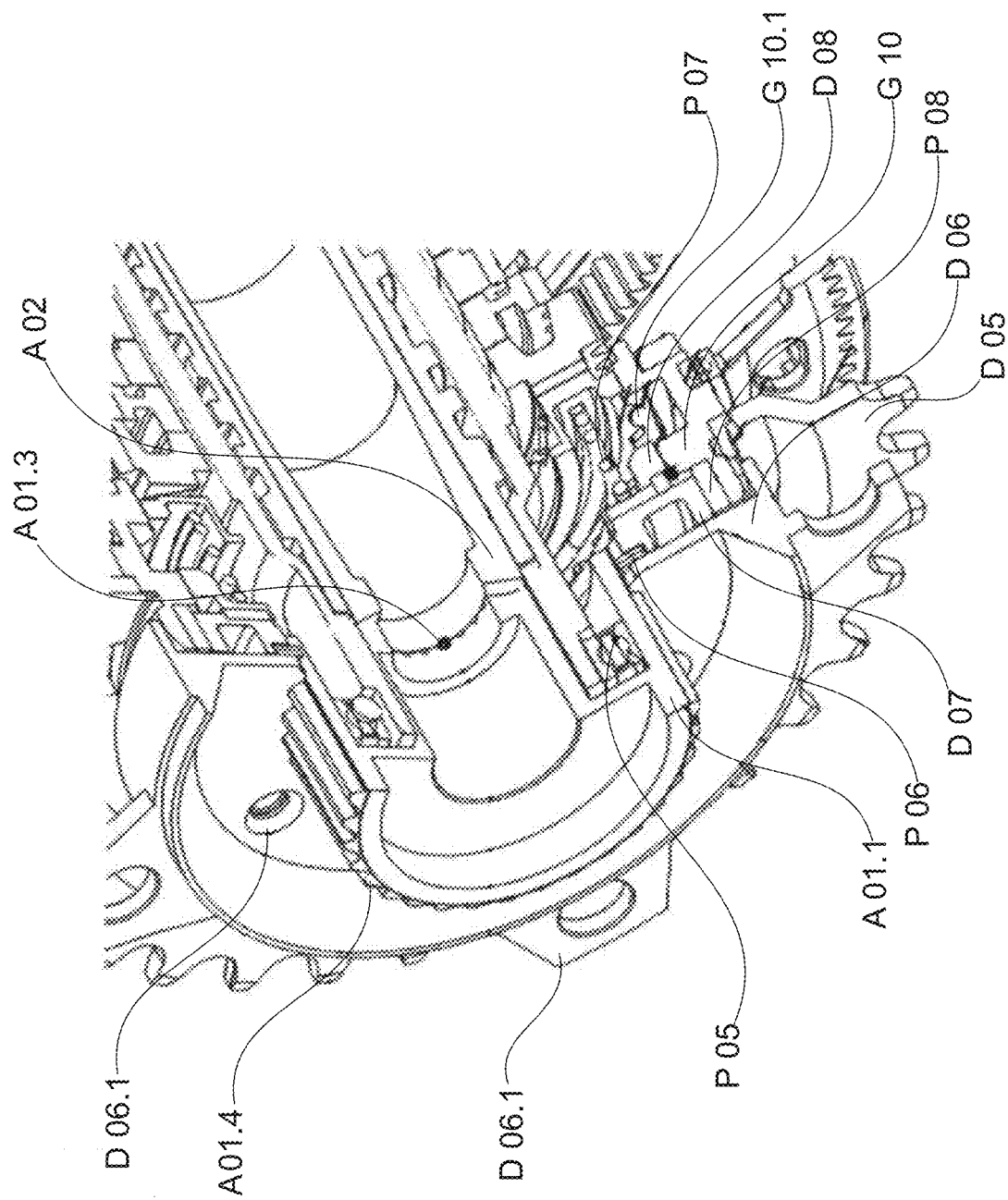

For a gearbox of this new type, the following inventive features are provided:
The bottom bracket shaft bearing is located in each case in the crank arm plane according to FIGS. 03 and 04.
The bottom bracket shaft rests on outer rings of the roller bearings (P 05). The ends of the bottom bracket shaft have an annular groove running around them in the axial direction.
The bottom bracket shaft therefore comprises at least two parts, but preferably three parts namely:
a crank adapter output side, (A 01.2)
a crank adapter input side, (A 01.1)
an unbearing bottom bracket shaft. (A 02)
The three parts are joined by means of a Hirth coupling (A 01.3), for example. The parts are braced against each other.

FIG. 05a: For the second bottom bracket of a tandem, basically the same construction is used as described above. Instead of a multi-part gear axle, two axle stubs (T1) and (T2) FIG. 05a with the corresponding bearing seats are screwed or pressed directly into the bottom bracket shell, or are made in one piece and screwed into the bottom bracket shell, or are formed as a one-piece bottom bracket shell. The tandem adapter for accommodating a chain/belt wheel is mounted on the crank adapter (A01.1) as previously described. A further preferred embodiment is to interchange the crank adapters in such a way that the tandem adapter is mounted on the right in the direction of travel. This means that this new type of bottom bracket shaft can be installed in all bicycles. The length of the bottom bracket shaft depends in each case on the structural requirements of the bicycle.

The gear axle has the following novel design, FIG. 05. The internally hollow gear axle comprises two parts (A 03) and (A 04), with a bearing journal at the end of each part onto which the ball bearings (P 05) of the bottom bracket shaft are slid. The part on the gearbox side houses the pawls or, in a novel way, the axial clutches, each of which can connect the sun gears to the axle in a torque-proof manner. (File number: DE 10 2018 007 326.3).

Figure 6:
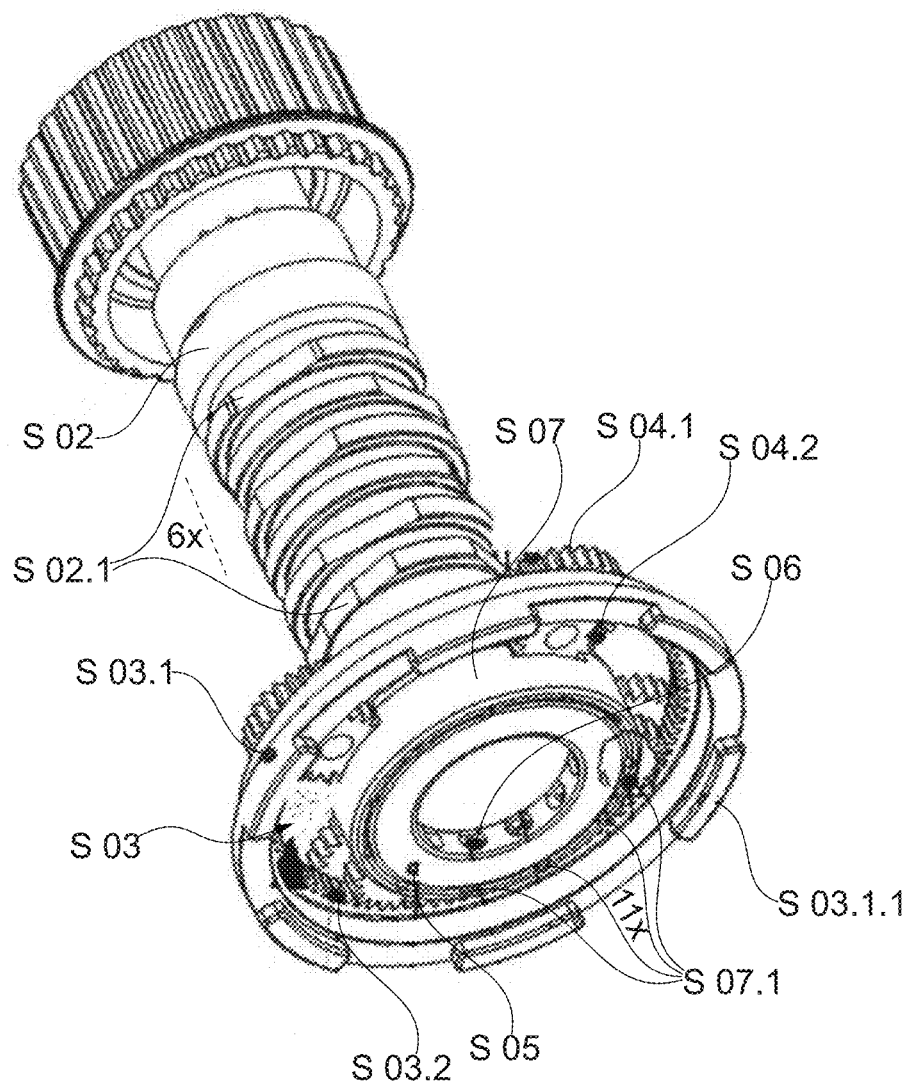
FIGS. 6 and 7 show a shifting rotor and a shifting ring for an eleven-speed transmission.
Figure 7:
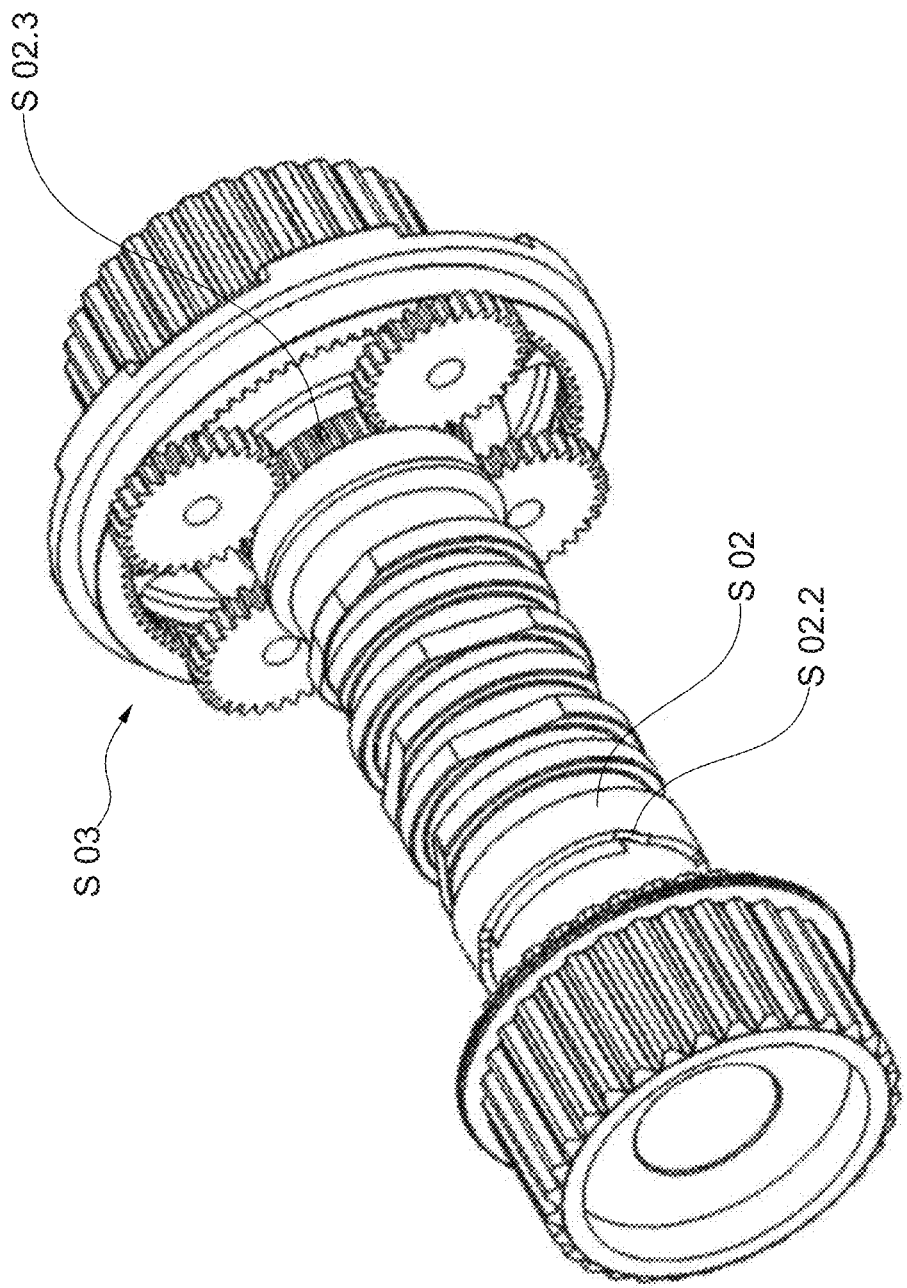

FIGS. 05, 06 and 07 show further details:
Inside the two-part gear axle, the bottom bracket shaft (A02) is coaxially freely rotatable. Both of the above-mentioned parts are rotatably connected to each other by means of the aforementioned ball bearings (P05) mounted inside the crank adapters (A01.1; A01.2).

Coaxially between the bottom bracket shaft and the gear axle is a shift drum (S 02) of known type freely rotatable. This comprises shift cams (S 02.1) and/or control curves (S 02.2); preferably, however, only control curves, with axial clutches being used exclusively for fixing the sun gears (AZ: DE-10 2018 007 326.3). A toothing (S 02.3) is located at the output side end of the shift drum for the purpose of coupling a control drive thereof.

In the area of the connecting plane of the two axle parts there is a planetary gear (S 03), which is formed as a stationary gear, with step planets if more than one rotation of the shift drum is required for all speeds or with single planets if at most one rotation of the same is required for shifting through all speeds (S 04.1; S 04.2) as a shift gear. Its ring gear (S 04.1) provides the drive, and a sun gear (S 02.3), which is torque-proofed to the shift drum (S 02), provides the output. A circumferential gap between the two axle halves, through which claws (S 03.1.1) attached to the ring gear reach outward, allows the shift drum to be driven, for example, by a pulley containing corresponding recesses.

The overall transmission ratio from a rotary handle of the gear shifting system on the handlebar to the shift shaft is, for example, 1:2 or 1:1.

FIG. 06 shows a shifting rotor and a shifting ring for an eleven-speed transmission. The shifting rotor (S 05) and the shifting ring (S 07), together with e.g. 11 ball catches (S 06) form the shifting detents. The shifting ring also centers the two axle halves, which are bolted together. The number of detent positions corresponds to the number of speeds that can be shifted in a shift drum rotation.

FIG. 01 shows a torque support (G 06) which introduces the counter-torques transmitted from the fixed sun gears to the axle by means of the axial couplings or pawls via the gear housing into the frame. This is advantageously formed so that it also serves as a sprocket housing; it is provided with openings (G 07) that allow the chain (belt) (G 04) to enter/exit the housing. The torque support is bolted to the axle and housing. If the chain wheel (G 11, FIG. 02) needs to be changed, the torque support can be easily removed. The pulley (S 01, FIG. 03), which rotates in a circumferential groove of the torque support, remains in the torque support. This means that the gearshift control is simply disconnected from the gearbox without opening it.

Figure 2A:
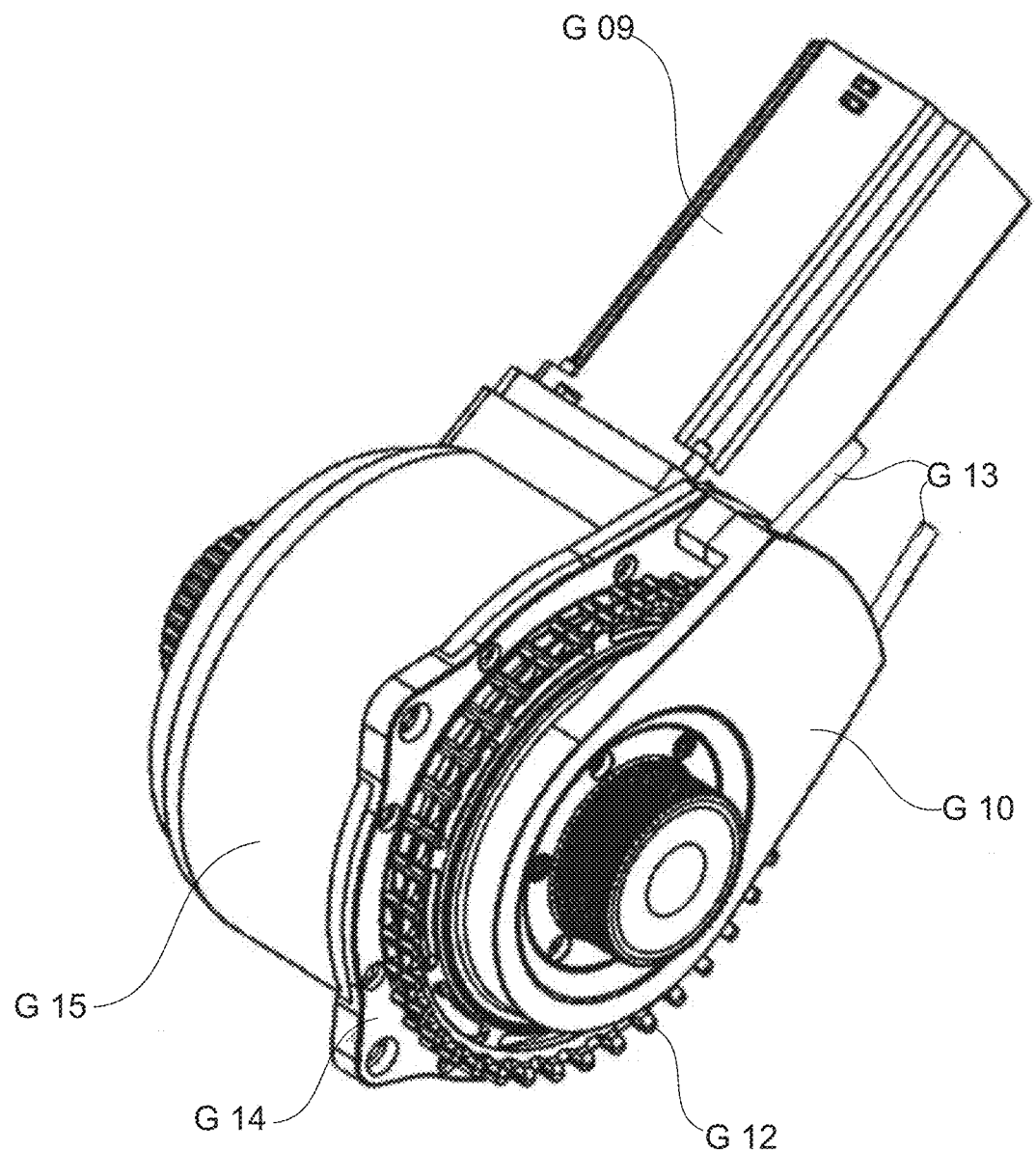
FIG. 2A shows an embodiment of the gearbox with a motor.

FIG. 02A shows an embodiment of the gearbox (G01) with a motor (G09) arranged orthogonally to the bottom bracket shaft, a further embodiment (G10) of the torque support (G10) with shift cable outer spirals (G13), a belt wheel (G12), a housing flange (G14) and a housing (G15).

Figure 2B:
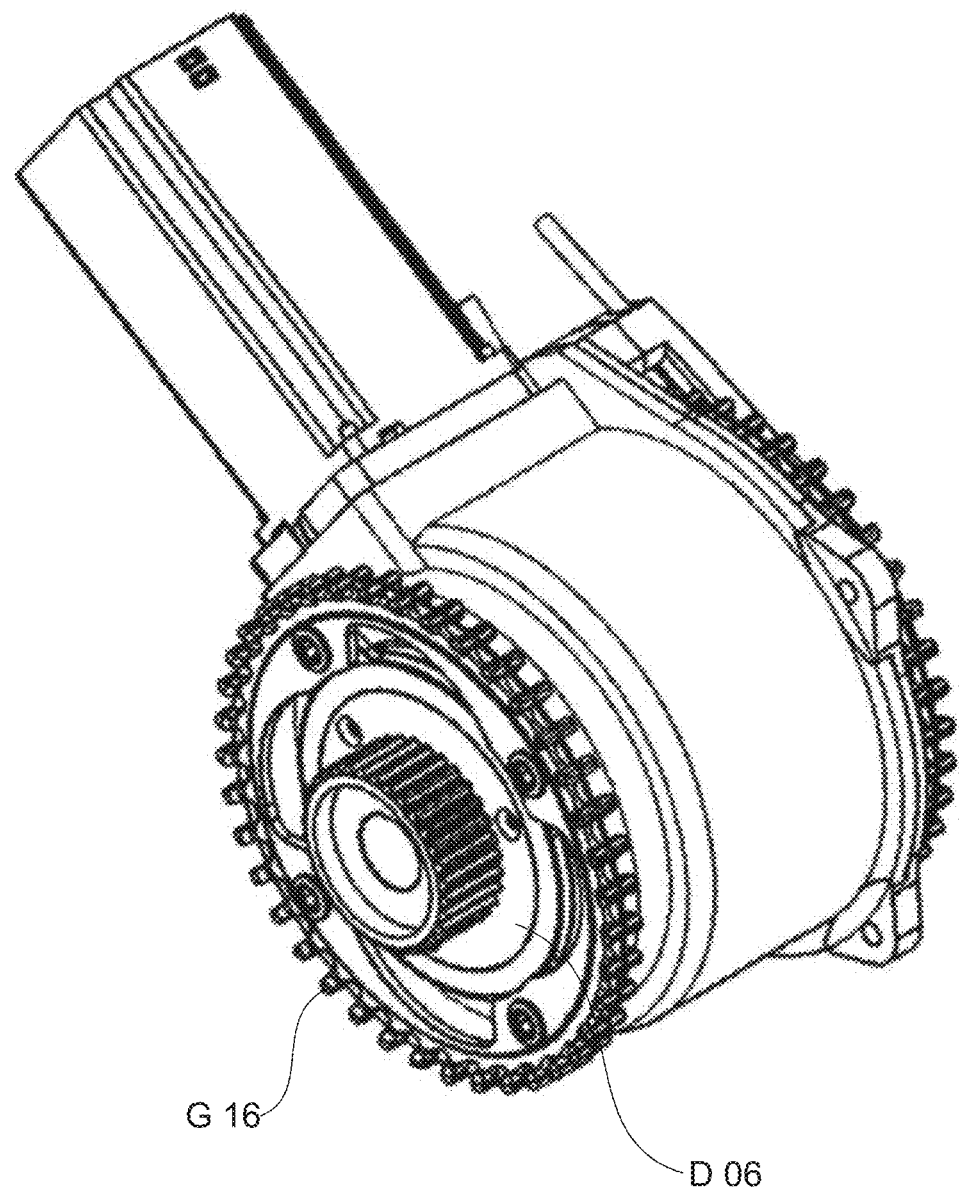
FIG. 2B shows the input side of the gearbox.

FIG. 02B shows the input side of the gearbox with a tandem adapter (D06) and a belt wheel (G16) and a known BCD 104 mm pitch circle diameter connection.

Figure 2C:
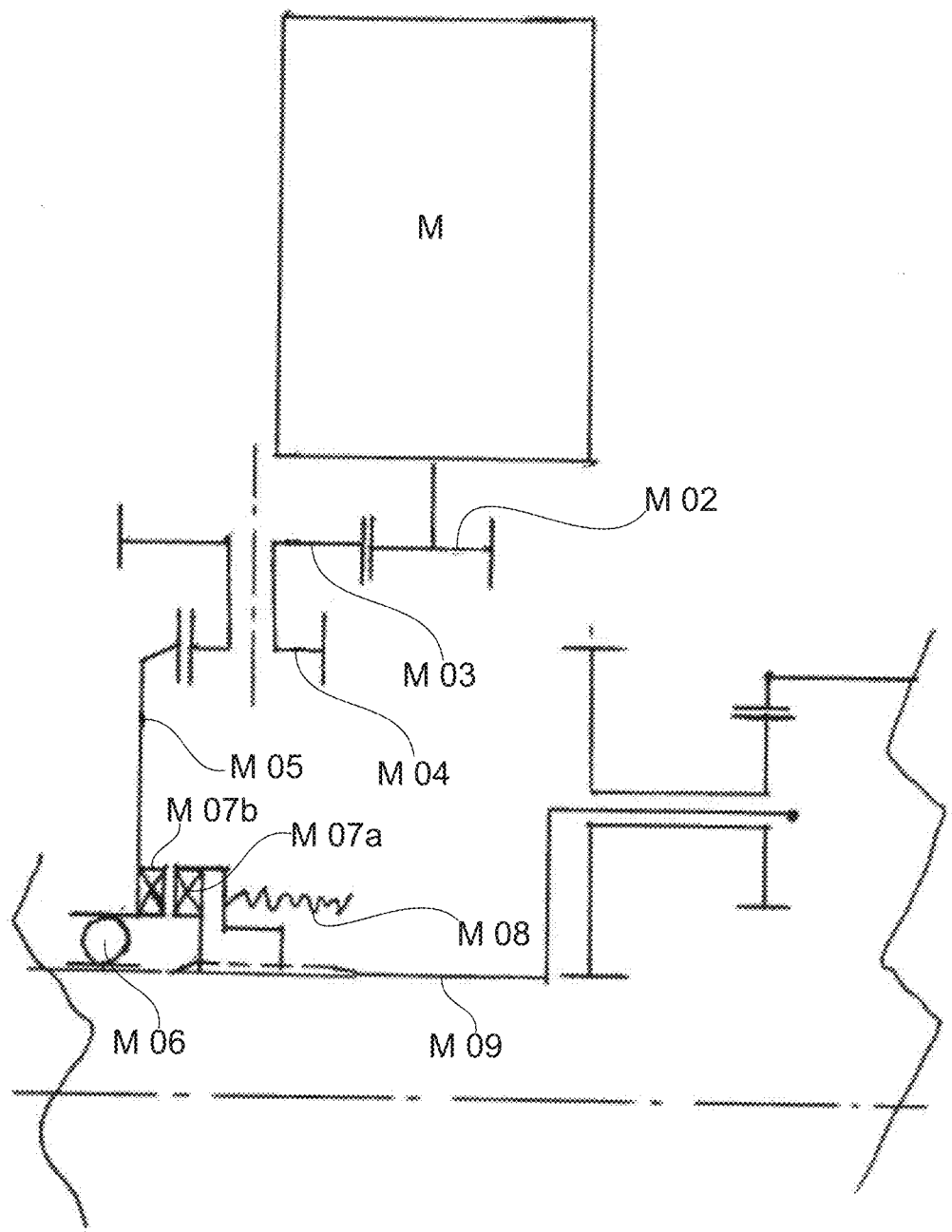
FIG. 2C shows the gear diagram for the reduction gear.

FIG. 02C shows the gear diagram for the reduction gear comprising the motor pinion (M02), the spur gear (M03), which is torque-proof connected to the spur gear (M04), and the crown gear (M05). The crown wheel is supported by the roller bearing (M06) on the driver/web with planet (M09). A decoupling clutch comprising the clutch parts (M07a), (M07b) and the spring (M08) operates automatically. This means that the freewheel function is triggered in a known manner when the engine comes to a standstill and the bottom bracket shaft continues to rotate. The clutch (M07a) inside is torque-proof connected to the crown wheel, while the clutch part (M07b) is torque-proof but slidably connected to the driver/web. The position (M09) symbolically shows the web/driver with planets and a ring gear.

Figure 2D:
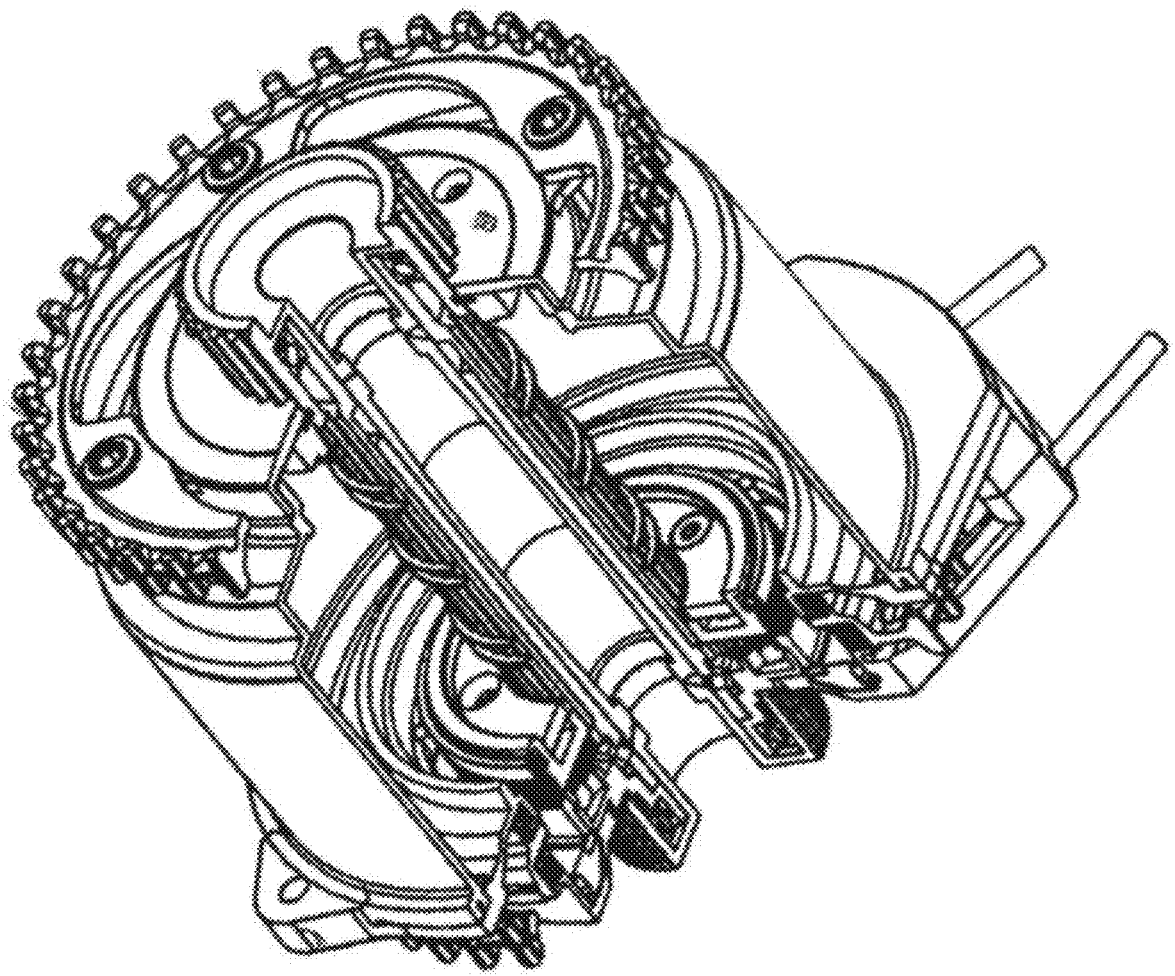
FIG. 2D shows a three-quarter section of the gearbox without a gear block.

FIG. 02D shows a three-quarter section of the gearbox (G01) without a gear block.

Figure 8:
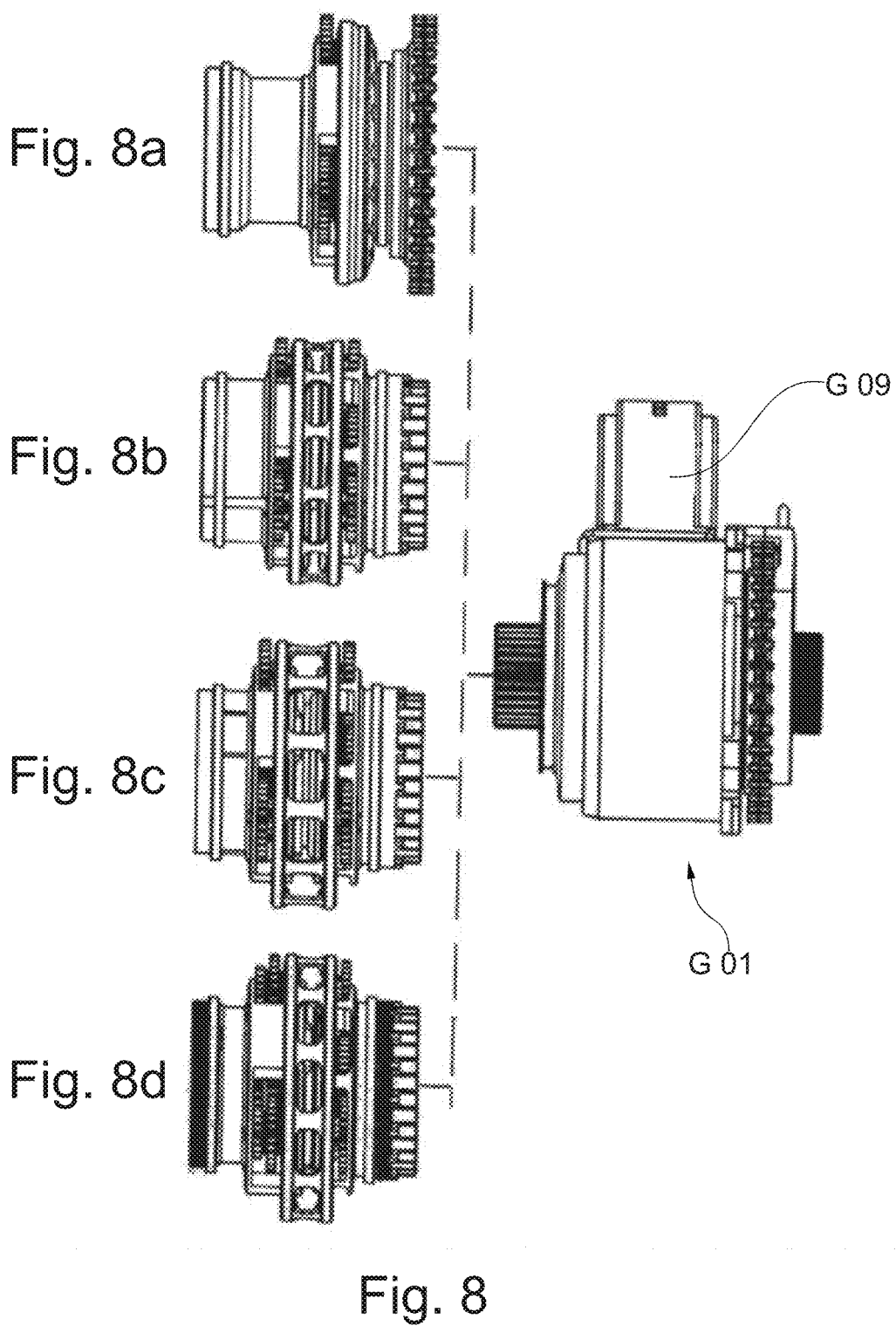
FIGS. 8A-8D show examples of the possibilities of the gearbox concept.
Figure 9A:
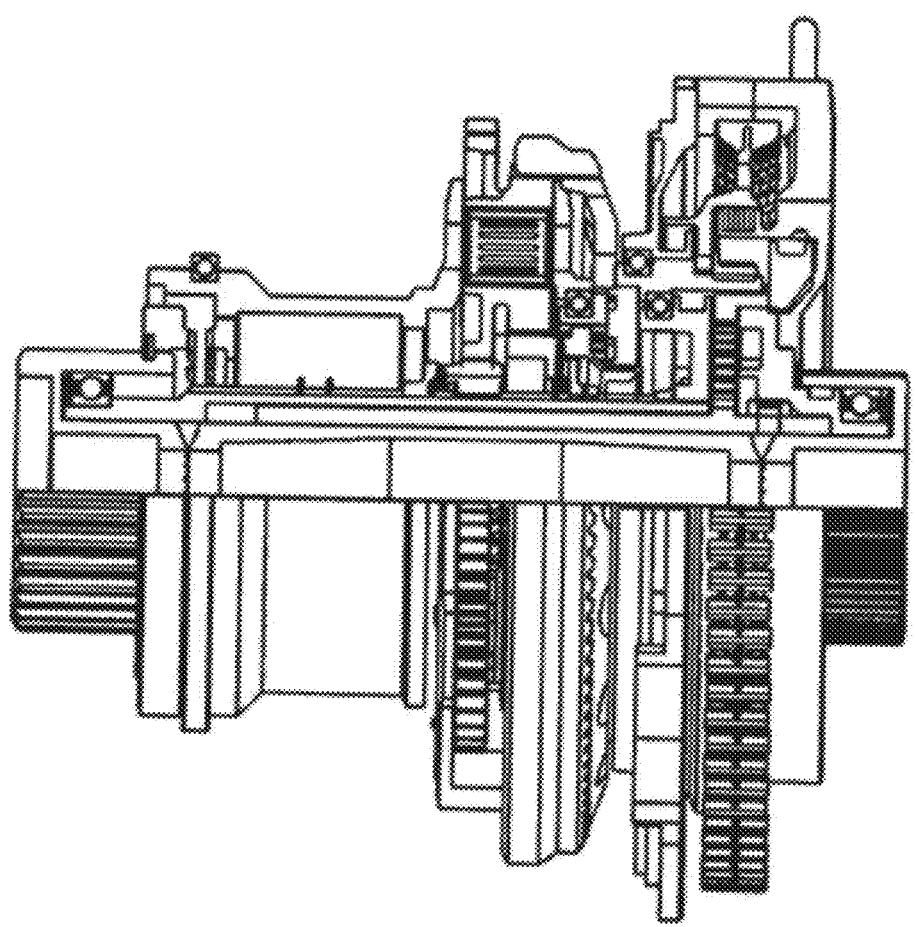
FIGS. 9A-9B show a three-quarter section of the gearbox constructed according to Table 2.
Figure 9B:
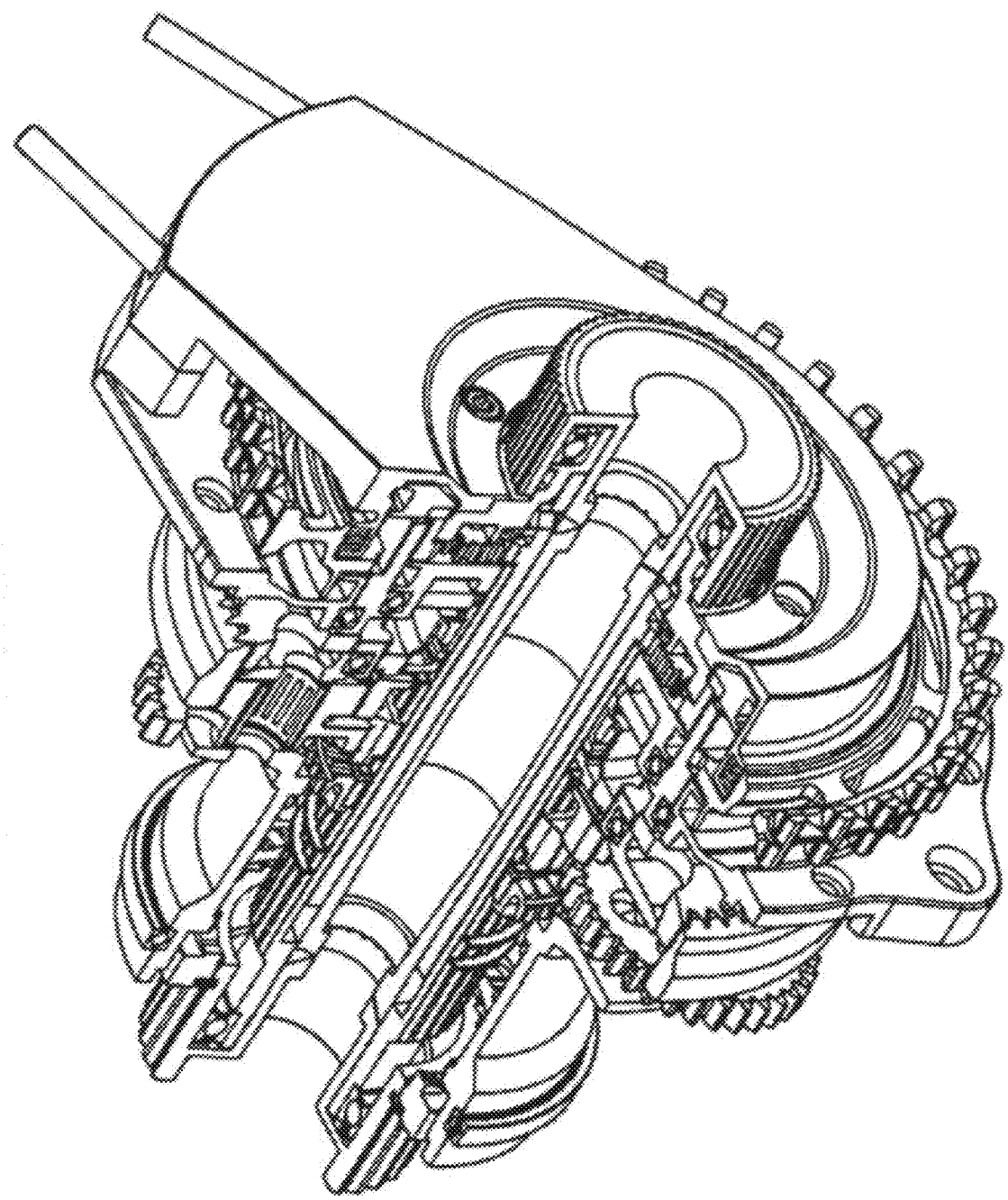

FIGS. 8A-8D show examples of the possibilities of the gearbox concept. The gearbox (G01) is configured so that the gear blocks shown in FIGS. 8A to 8D can be incorporated into the assembly shown in FIG. 2d. FIG. 8A represents a three-gear block according to Table 2, FIG. 8B a four-gear block according to Table 3, FIG. 8C five- or seven-gear blocks according to Tables 4, 7 and 9, and FIG. 8D a six-gear block according to Table 5. A three-quarter section of the gearbox constructed according to Table 2 is shown in FIGS. 09A and 09B in various views, but without housing.

The drive train according to the invention also provides an advantageous design of a drive train swing arm. Numerous designs are known for the body rear end of full-suspension bicycles. What they all have in common is that the axis of rotation of the rear end with the rear wheel installed there is placed at least in the vicinity of the axis of rotation of the bottom bracket shaft. There are known two types of swing arms:

Either the bottom bracket is pivoted by means of multiple joints, virtually around the bottom bracket axis or another suitable point; or in the second variant, the swing arm is hinged to the frame by means of a bearing more or less remote from the bottom bracket rotation axis.

None of the aforementioned solutions remains free of reaction on the pedals due to compression, or the driver's drive torque has repercussions on the suspension. A drive train swing arm is known (www.mtb-news.de/news/2015/07/27/hnf-heisenberg-xfl-e-mtb-pedelec-bmw-i-nicolai/), which contains the entire drive train including the motor in a swing arm with numerous elements of a coupling gear. This version requires complicated kinematics, many joints with corresponding bearings, in order to keep the swing arm approximately pivotable around the axis of the bottom bracket. The previously described embodiments of the invention for coupling the body rear end avoid the above disadvantages and can be produced with low kinematic complexity and few parts. Only one bearing unit is also required to move the swing arm (not including the damper/spring bearing). If the bottom bracket gear is fixed to the frame, the swing arm rotates around the gearbox and the secondary transmission ratio of the chain or belt drive is i_Sek=1, the pedal movement is not affected by the deflection of the swing arm.

Figure 10:
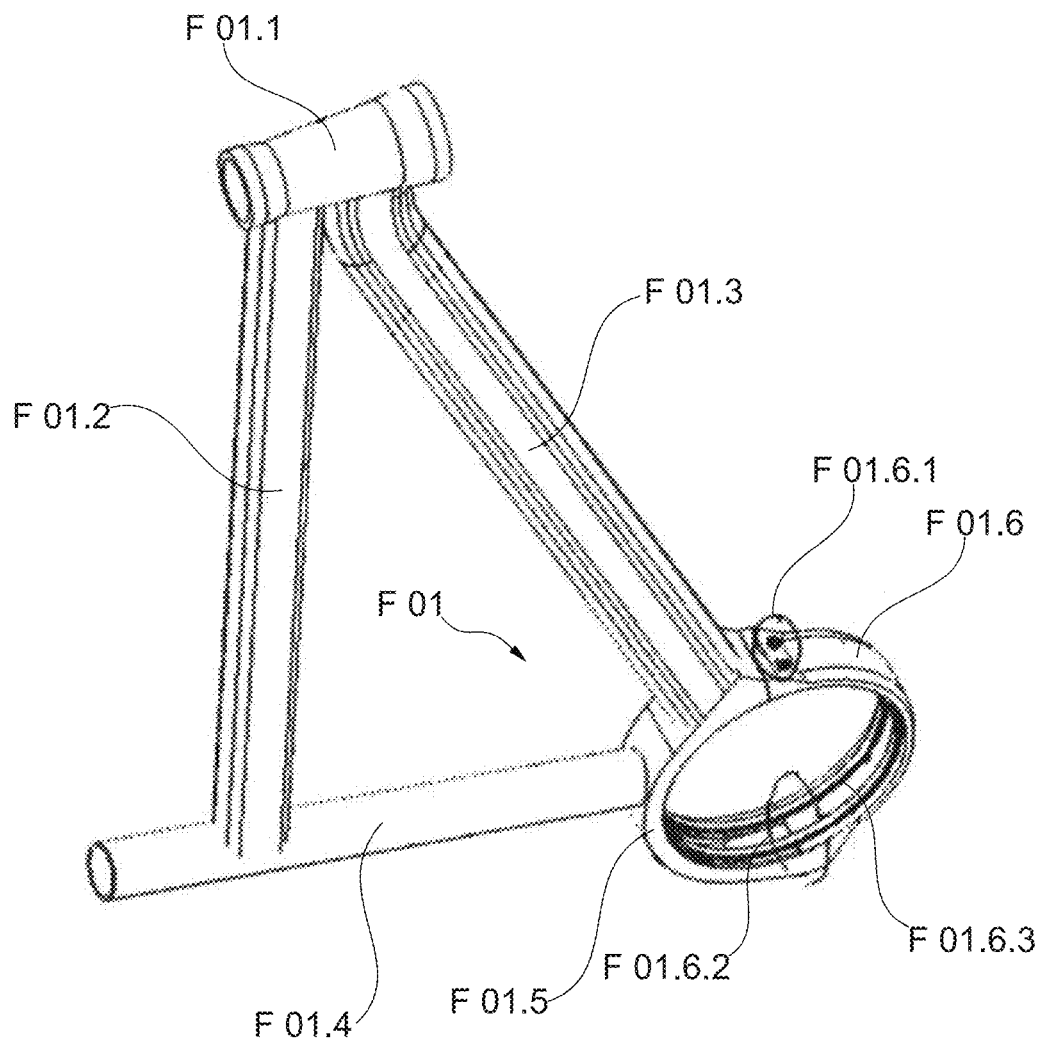
FIG. 10 shows the main frame.
Figure 11:
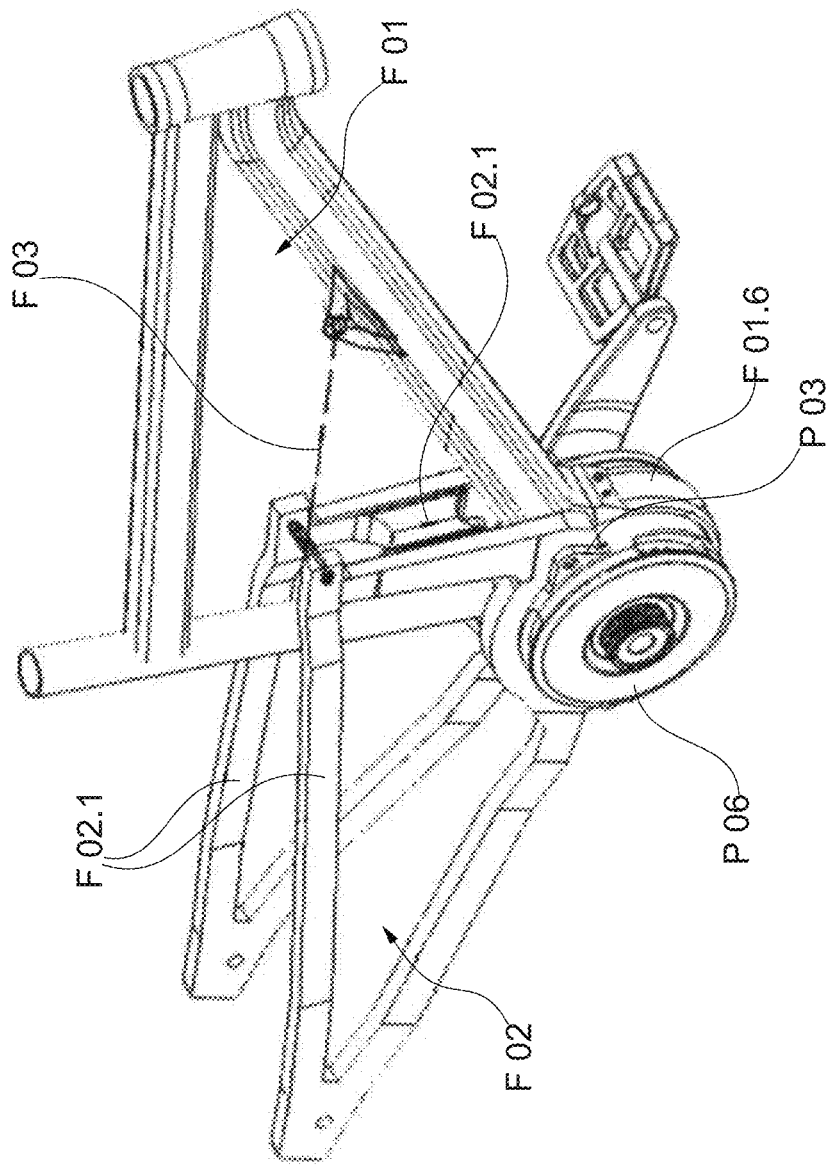
FIG. 11 shows the complete frame with the body rear end.

FIG. 10 shows the main frame (F01), comprising the frame tubes (F01.1) to (F01.4), the adapter (F01.5), the clamp (F01.6) and the screws (F01.6.1). The roller bearings (F01.6.2) and (F01.6.3) are used to support the gearbox when it is torque-proofed to the swing arm. FIG. 11 shows the complete frame with the body rear end (F02), comprising the parts (F02.1) and a spring and damper (F03).

Muscle-driven single- or multi-track vehicles, with or without a supporting motor, require only moderate power for their drive, but this is at very low speeds, namely between approximately 60 and 120 rotations per minute. This requires high torques, often reaching several hundred Nm. The requirements for gearboxes with gear wheels are correspondingly high. Involute toothing with a pressure angle of approx. 20 degrees and a symmetrical profile is usually used. If the requirements are high, they are met by a suitable selection of materials, post-treatment of the teeth, such as hardening and grinding, and a suitable choice of tooth module and tooth width, or a profile shift, optimization of the tooth root contour and, last but not least, by increasing the pressure angle. This allows the load capacity to be increased, to name just a few of the known possibilities. However, there are narrow limits to increasing the pressure angle (tip limit).

A further advantageous embodiment of a bicycle gearbox or its drive train provides asymmetrical toothing of the gear wheels.

Figure 12:
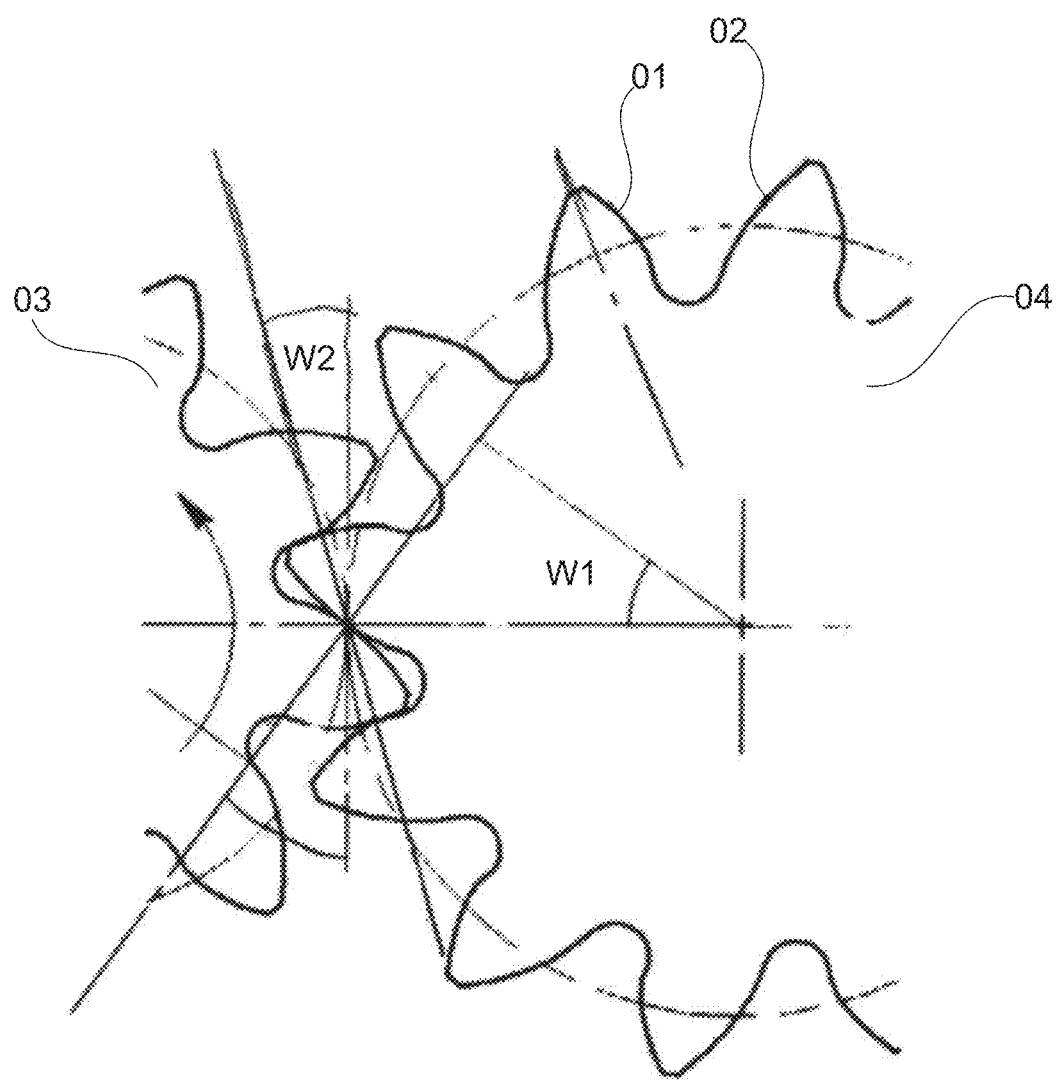
FIG. 12 shows the meshing situation for a spur gear pair.

The fact that the teeth are loaded predominantly in only one direction is used to eliminate the aforementioned limitations according to the invention. According to the invention, the toothing is embodied asymmetrically, i.e. the load-bearing flank under tensile stress has a large pressure angle—e.g. 30 to 45 degrees and above—and the unloaded flank under compressive stress has one of about 20 degrees or less. Consequently, one flank is strengthened at the expense of the other. In conjunction with tooth root optimization, significantly improved load capacities can be achieved in this way. FIG. 12 shows the meshing situation for a spur gear pair. Item (03) is the driving wheel, item (04) the driven wheel. The flank (01) has a pressure angle of about 25 degrees and the flank (02) has a pressure angle 35 degrees.

The invention claimed is:

1. A drive train for muscle-driven single- or multi-track vehicles comprising:
   a first gearbox comprising a crank-driven bottom bracket gearbox which is connected on an output side to a chain or belt drive, from which a chain or belt leads directly or switchably in each case to a pinion of a rear wheel hub, wherein the crank-driven bottom bracket gearbox having n speeds,
   a second gearbox arranged downstream from the first gearbox in the drive train as a shiftable rear wheel hub gearbox with m=two or m=three speeds, where the n and m are natural numbers, so that the drive train comprises up to n times m speeds, where the n speeds are arranged in the bottom bracket gearbox and the m speeds are arranged in the rear-mounted gearbox,
   wherein said crank-driven bottom bracket gearbox comprises a first shift drum and said rear wheel hub gearbox comprises a second shift drum, each of the first shift drum and the second shift drum comprises at least one of control curves and control grooves, and the first shift drum and the second shift drum to be continuously shifted from a single rotary or shifting handle.

2. The drive train according to claim 1, wherein the rotary or switching handle is connected to the first shift drum and the second shift drum by a looped-through cable or in each case by a respective associated cable.

3. The drive train according to claim 1, wherein the first and second gearboxes are planetary gears.

4. The drive train according to claim 3, wherein the second gearbox consists of two symmetrical dividing gears with transmission ratios $i\_a=s^m<2$ and $i\_b=1/i\_a$, an input and output of which is effected in each case via a web or ring gear, the two dividing gears being coupled via the webs and the ring gears effecting the input and output, or the two dividing gears being coupled via the ring gears, which are held in an overhung manner and have webs that effect the input and output.

5. The drive train according to claim 3, wherein the second gearbox consists of two symmetrical dividing gears with transmission ratios $i\_a=s^m>2$ and $i\_b=1/i\_a$, an input and output of which is effected via sun gears and webs, respectively, the sun gears being connected to one another and the webs effecting the input and output.

6. The drive train according to claim 1, wherein the first gearbox has the n speeds with almost equal speed steps of $s=(1+p\%/100)$, thus a first gear ratio range of $s^(n-1)$ and the second gearbox has two further speed steps of $i\_1=s^(m)$ and $i\_2=1$, thus providing a total gear ratio range of $s^(2m-1)$, wherein the rear-mounted gearbox has three evenly stepped speeds, a first slow speed with $i\_1=s^(m)$ being a relatively slow speed, the second speed with $i\_2=1$ being a direct speed and the third speed with $i\_3=s^(m)$ being a relatively fast speed, resulting in a total transmission ratio of $s^(3m-1)$.

7. The drive train according to claim 6, wherein, of 2m or 3m switchable speeds, only successive $k\_1<2m$ or $k\_2<3m$ speeds are switched.

8. The drive train according to claim 7, wherein the first bracket gearbox is formed as a 7-speed gearbox so that 21 speeds can be shifted in the entire drive train.

9. The drive train according to claim 8, wherein the switchable speeds have a speed step of at least 12% each.

10. The drive train according to claim 1, wherein the first gearbox is coaxially penetrated by a bottom bracket shaft, which where appropriate is connected to an auxiliary electric motor and/or a tandem drive on an input side, for which at least one further chain or belt wheel is arranged on the bottom bracket shaft.

11. The drive train according to claim 10, wherein the bottom bracket shaft is connected to the auxiliary electric motor, and the auxiliary electric motor is arranged together with an overrunning clutch and a decoupling clutch on the transmission housing or bicycle frame axially parallel or axially orthogonal to the bottom bracket shaft.

12. The drive train according to claim 10, wherein the bottom bracket shaft is formed in three parts from a middle tubular part with end crank adapters in a self-centering, torsionally rigid, spur-toothed, axially screwed and braced manner, or in two parts formed only from crank adapters of matching length.

13. The drive train according to claim 12, wherein a tandem adapter is arranged on a crank adapter, and a circlip and a freewheel disk (D07) as part of a decoupling clutch which is axially screwed to the tandem adapter and is coupled by gear teeth in an axially displaceable manner in one direction of rotation only to a driver of the first gearbox.

14. The drive train according to claim 13, wherein at least one gearbox load-bearing flank of the teeth has a large pressure angle and unloaded flanks have a small pressure angle.

15. The drive train according to claim 14, wherein the at least one gearbox load-bearing flank has a pressure angle of 25 to 45 degrees and unloaded flanks have a pressure angle of at most 20 degrees.

16. The drive train according to claim 10, wherein the bottom bracket shaft is mounted by ball bearings on a hollow gear axle in which the first shift drum is rotatably mounted which carries the control curves or the control grooves for gear shifting of a first planetary gear arranged on the gear axle and is to be driven at the end via a second planetary gear by a pulley for gear adjustment.

17. The drive train according to claim 16, the gear axle is formed at least in two parts and carries a shifting ring which is mounted in a rotationally fixed manner and carries recesses for ball catches which, mounted on a shifting rotor, set the shift positions of the first shift drum.

18. The drive train according to claim 1, wherein the first gearbox including the chain or belt drive is enclosed by an at least three-part housing, wherein one housing part encompasses the chain or belt drive and has passages for the chain or belt and as a torque support connects the axle in a torque-proof manner to at least one of the other housing parts, which in turn are connected to a bicycle frame.

19. The drive train according to claim 18, wherein a body rear end is pivotably mounted about the housing of the first gearbox, which is connected to the bicycle frame in a torque-proof manner, coaxially with a bottom bracket shaft.

20. The drive train according to claim 18, wherein the housing of the first gearbox is torque-proofed to a body rear end and is coaxially pivotable about a bottom bracket shaft in the bicycle frame.

* * * * *